Dec. 12, 1950 G. E. GAGNIER 2,533,786
FASTENING STRIP
Filed April 8, 1946 2 Sheets-Sheet 1
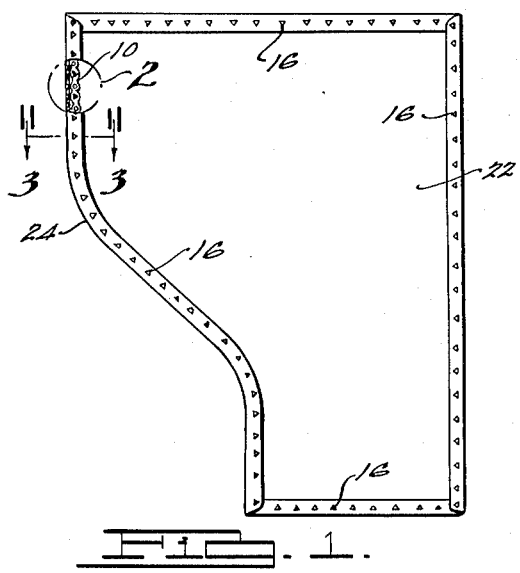
Fig. 1.
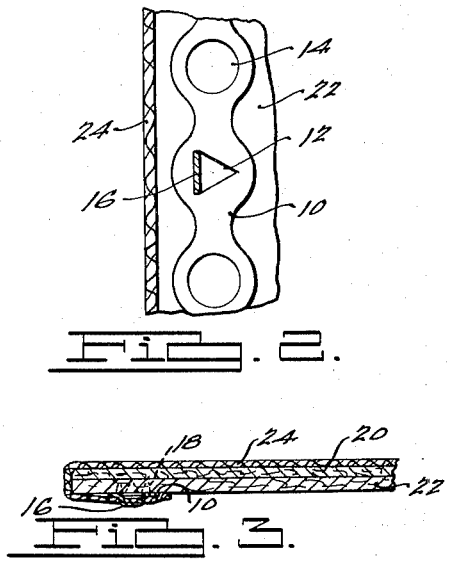
Fig. 2.
Fig. 3.
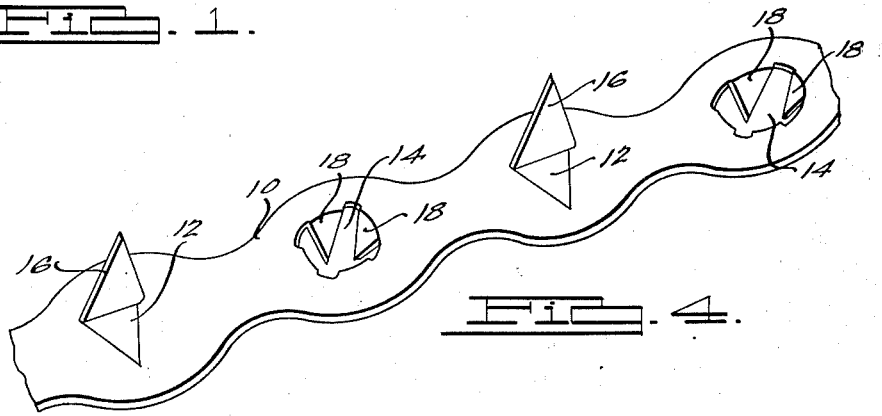
Fig. 4.
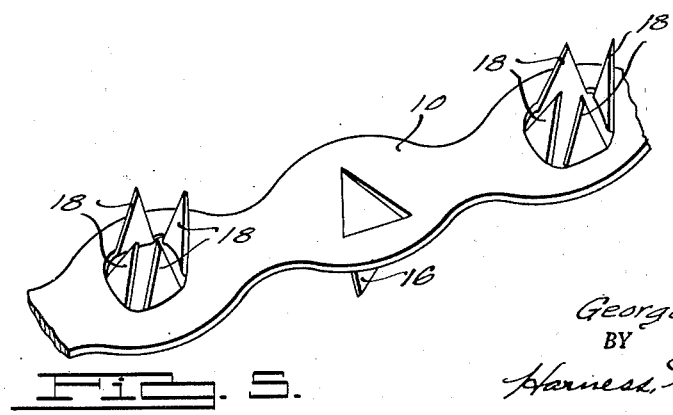
Fig. 5.
INVENTOR.
George E. Gagnier
BY
Harness, Dickey & Pierce.
ATTORNEYS.

Dec. 12, 1950   G. E. GAGNIER   2,533,786
FASTENING STRIP
Filed April 8, 1946   2 Sheets-Sheet 2
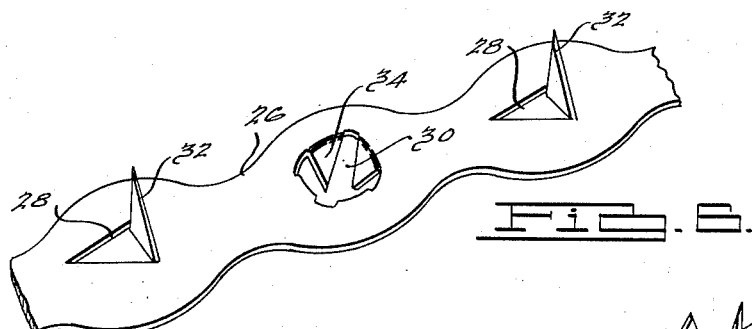
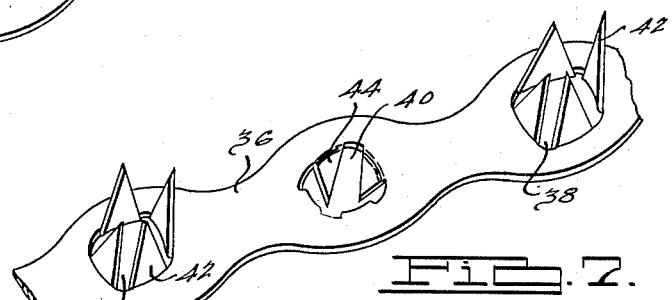
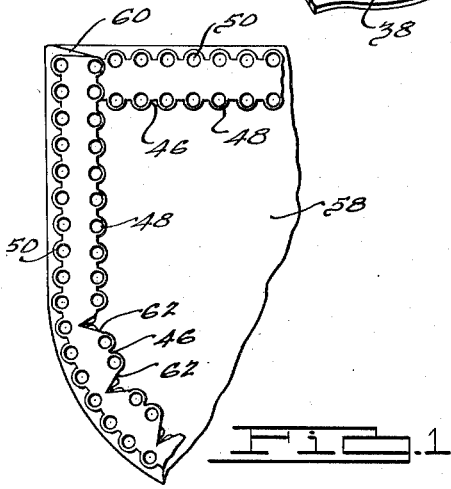
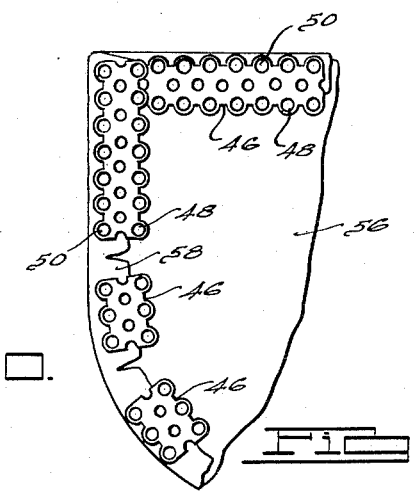
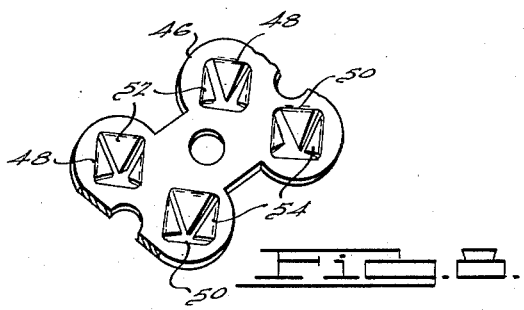
INVENTOR.
George E. Gagnier
BY
Harness, Dickey & Pierce
ATTORNEYS Patented Dec. 12, 1950

2,533,786

UNITED STATES PATENT OFFICE 2,533,786

FASTENING STRIP

George E. Gagnier, Detroit, Mich.

Application April 8, 1946, Serial No. 660,452

3 Claims. (Cl. 45—138)

This invention relates generally to fastening strips. More particularly, it relates to a novel and improved form of fastening strip which is easy, simple, and cheap to manufacture.

In the broader aspects of the invention, the same is concerned with novel and improved means for effectively engaging disassociated elements one to the other. It will be readily apparent, therefore, that the improvements of the present invention will be of great usefulness in a wide variety of constructions.

The present invention is specifically concerned with novel and improved means for securing fabric trim material to backing sheets which have been covered with suitable padding to provide an inner trim panel construction primarily adapted for use in automotive vehicles.

It is conventional practice in the manufacture of trim panels, for use in automotive vehicles, to prepare first a backing sheet by applying a uniform layer of padding material thereto and subsequently trimming the edges of the backing sheet to a desired contour. After preparation of such backing sheet, the whole is covered with a layer of fabric finish material which is generally stretched over the padded surface of the backing sheet, folded around the edges thereof, and adhesively secured to the reverse side thereof.

As can be appreciated, use of this adhesive material has its disadvantages. Care must be exercised to prevent such adhesive material from getting on the finished side of the trim panel and use of the same also represents an added operation in the series of operations necessary to manufacture such trim panel.

The present invention contemplates a novel and improved fastener strip to secure the edges of the trim material to a backing sheet as the same are folded over the edges of such backing sheet, thereby eliminating the use of adhesive.

Another object of the present invention is to provide a fastening strip which is easy and simple to manufacture and may be stored in a roll or coil adapted to be cut into lengths suitable for use.

A further object of the present invention is to provide a fastening strip which may be applied for securing trim material to the backing sheet of a trim panel at the same time the trim material is folded over the edges of the backing sheet and pressed down upon the reverse side.

Still further, the present invention contemplates the provision of an improved fastening means for securing trim material to a backing sheet which will increase the rate of production of trim panels by eliminating use of adhesive.

Many other and further objects, advantages, and features of the present invention will become obvious upon a consideration of the following specification, taken in connection with the accompanying drawings forming a part thereof.

In the drawings:

Figure 1 is an elevational view of the reverse side of a trim panel, illustrating the trim material held to the backing sheet with a fastening strip embodying the improvements of the present invention.

Figure 2 is a substantially enlarged view of the construction shown within the circle 2 of Figure 1.

Figure 3 is an enlarged, sectional view taken on line 3—3 of Figure 1, illustrating in detail one manner in which the improvement of the present invention may be employed to secure trim material to a backing sheet.

Figure 4 is a greatly enlarged perspective of one surface of a fastening strip embodying the improvements of the present invention.

Figure 5 is a greatly enlarged perspective of the fastening strip illustrated in Figure 4 showing the opposite surface of said strip.

Figure 6 is an enlarged perspective of a modification of a fastening strip embodying the improvements of this present invention.

Figure 7 is an enlarged perspective showing another modification of the fastening strip of this invention.

Figure 8 is an enlarged perspective illustrating in detail still another modified fastening strip.

Figure 9 is an elevational view of the reverse side of a trim panel illustrating one manner in which trim material may be secured to a backing sheet with the modified fastening strip of Figure 8.

Figure 10 is an elevational view of the reverse side of a trim panel illustrating another manner in which trim material may be secured to a backing sheet with the modified fastening strip of Figure 8.

With more specific reference to the forms of the invention shown in the drawings, it will be readily appreciated that the constructions illustrated thereat are merely illustrative of the various embodiments which the present invention may take.

The plan configuration of the fastening strip of this invention may be formed irregular in outline as it has been found economical to stamp such fastening strips from sheets of considerable width and by providing such strips with an irregular outline in plan form, obtain more strips from a width of sheet stock than would be possible had the plan form of the fastening strip been that of an elongated rectangle. As illustrated, the strip 10 has openings such as indicated at 12 and 14 alternately spaced throughout its length. These openings are formed by punching out tongues or projections from opposite surfaces of the strip 10 and the metal struck out therefrom directed outwardly from such surfaces, substantially perpendicular thereto, to form fastening elements 16 and 18 at the openings 12 and 14, respectively. Such fastening elements or tines, as hereinafter will become more clear, enable the fastening strip to secure the trim material to a backing sheet.

In order to use the fastening strip of this invention in the manufacture of a trim panel, wadding, indicated at 20, is applied in the usual manner to a backing sheet 22. After this, the edges of the backing sheet 22 are trimmed in the conventional manner and trim material 24 stretched thereon. The edges of the trim material 24 are then folded around the edges of the backing sheet 22, with the padding 20 thereon, to the reverse side of such backing sheet. At this time, a suitable length of fastening strip is inserted between the reverse face of the backing sheet 22 and the folded edge of the trim material 24 with tines 18 thereon directed toward the backing sheet. Upon pressing on the outer surface of this folded edge of the trim material 24 with a roller or other suitable means, tines 18 penetrate the backing sheet 22, while tines 16 of the trim strip 10 penetrate the trim material, and are folded over. In this manner, the trim material 24 is secured to the backing sheet 22, as may be seen in Figure 3.

In the modification illustrated in Figure 6, the fastening strip 26 is provided with punched openings 28 and 30. Such openings 28 and 30 are punched from opposite sides of the fastening strip 26. The metal struck out from openings 28 and 30 forms the pointed tine 32 at opening 28 and a plurality of tines 34 at opening 30. As in the case of fastening strip 10, the metal is stamped out from the openings 28 and 30 and directed outwardly from the respective surfaces of fastening strip 26 substantially perpendicular to said surfaces. It will be observed that opening 28 is punched in the fastening strip 26 in the direction of the longitudinal axis of such fastening strip. This is in contrast to opening 12 which is punched transversely of fastening strip 10. In use, however, this modified form of the fastening strip is applied to a trim panel in the manner described in the foregoing for securing trim material to a backing sheet by means of the fastening strip 10.

Another modification is illustrated in Figure 7. In this form, a fastening strip 36 is provided with punched openings 38 and 40. Again, such openings are punched from opposite sides of the strip, but in this case, the metal extruded at each opening forms a plurality of tines, which are indicated by 42 at openings 38 and by 44 at openings 40.

In order to secure trim material to a backing sheet with this modified form, the fastening strip 36 is placed between the folded edge of the trim material and the reverse face of the backing sheet exactly as described for the fastening strip 10. Then, by means of a roller or other suitable means, the tines on one side of the fastening strip are caused to penetrate the backing sheet while those on the other surface penetrate the trim material and are bent to hold such trim material to the backing sheet. This form of the fastening strip, having a plurality of fastening elements or tines outwardly directed therefrom at each opening, irrespective of which surface such fastening elements are outwardly directed from, is of advantage in that it may be used without regard to which surface of the fastening strip is turned toward the backing sheet inasmuch as a plurality of fastening elements are formed at each opening. This form of fastening strip is also desirable in that with the increased number of fastening elements or tines, it is possible to hold trim material of considerable thickness or trim material which is stretched extremely tight and due to the increased number of holding elements, no concern need be felt as to the ability of such fastening strip to hold the trim material to the backing sheet.

Inasmuch as the fastening strips illustrated in Figures 4, 5, 6, and 7 may be made relatively narrow, it will be appreciated that the same may be readily fitted to the contour of a trim panel. Consequently, these forms of the invention may be used to secure trim material to a backing sheet without cutting the same into short lengths when it is desired to apply a fastening strip to a panel having a curved outline.

Figure 8 illustrates still another modification of the fastening strip. In this form, the fastening strip 46 has a double row of openings, such as indicated at 48 and 50, laterally spaced from each other and punched along each edge of such fastening strip. The openings 48 and 50 of fastening strip 46 are punched from the same surface of such strip and the metal struck out from at each opening is outwardly directed from one surface, substantially normal to said surface to form at each opening a plurality of tines such as indicated at 52 at opening 48 and 54 at opening 50. Therefore, it will be appreciated, inasmuch as all the fastening elements on fastening strip 46 are outwardly directed from the same surface thereof, that this form of the fastening strip is used in a slightly different manner than the previously described forms.

Thus, when it is desired to secure trim material to a backing sheet by means of this modified form of the invention, a trim panel having backing sheet 56 and covered with trim material 58 is built up as described in the foregoing. As before, the edges of the trim material 58 are turned over the edges of the backing sheet 56 against the reverse face of said backing sheet. At this time, desirable lengths of fastening strip 46 are positioned as indicated in Figure 9. Then, by means of a roller or other suitable means, the fastening elements or tines 52 and 54 of such fastening strip are pressed into the backing sheet and the trim material. In this way, one row of fastening elements penetrates the backing sheet 56 while the other row penetrates the trim material 58, securing said trim material to the backing sheet. This modified form of the invention also has the advantage that a plurality of fastening elements engage both the backing sheet and the trim material and has the further advantage that when used it is always in the operator's view and within reach of his hand so that it may be readily and easily positioned while the trim material is secured to the backing sheet.

As a further illustration of the advantages of the modified form of the fastening strip 46, Figure 10 shows such fastening strip applied to secure trim material to a backing sheet in still another manner. In this case, backing sheet 58 is covered with trim material 60 in the usual manner. However, instead of cutting the fastening strip 46 into short lengths where it is necessary to apply the same in curved portions of the trim panel, as previously illustrated by Figure 9, a V such as indicated at 62 may be cut in the fastening strip by means of a pinking tool or other suitable means. This V cut in the fastening strip allows the same to be easily bent around such curved portion of the trim panel, making it possible to use a continuous length of the fastening strip rather than cutting the same into a number of shorter pieces. In this way the operator or assembler may apply the same in the manner described in the foregoing without the necessity of handling a number of shorter lengths of the fastening strip.

From the foregoing, it will be obvious that by using the fastening strip of this invention, it is possible to quickly and easily secure trim material to a backing sheet in the manufacture of trim panels for automobiles without use of adhesive substances.

It will be clear from the foregoing description that the fastening strip shown in the drawings and described above has been illustrated and described in rather specific detail. Obviously, many modifications, changes, and departures from the above described construction may be made without departing from the generic spirit and scope of the invention as set forth in the subjoined claims.

What is claimed is:

1. In an automotive upholstery panel construction comprising a relatively stiff fibrous backing member and a fabric covering member stretched over one surface thereof and anchored adjacent its edges to the opposite side thereof, anchoring means for securing said fabric to said panel comprising a relatively flexible elongated metallic strip having perforations therein, the metal from said perforations being struck outwardly to provide relatively sharp prongs extending generally perpendicularly to the body of said strip, some of said prongs projecting from one side of said strip, and other of said prongs projecting from the opposite side of said strip, said first mentioned prongs entering into and anchored to said fibrous panel and last mentioned prongs adapted to pass through and clinch over said fabric material to anchor the same in position.

2. An upholstery trim panel for automotive vehicles comprising in combination a relatively stiff fibrous backing member, a fabric covering material stretched over said backing member, around the marginal edges thereof and secured to the reverse side thereof fastening means for securing said covering material to the reverse side of said backing member comprising a relatively flexible elongated metallic strip having spaced perforations therein throughout its length, the metal from said perforations being struck outwardly from said perforations to provide relatively sharp tapering prongs, some of said prongs projecting from one side of said strip in a direction generally perpendicular to the body of said strip and other of said prongs projecting perpendicularly from the opposite side of said strip, said first mentioned prongs being adapted to enter into and anchor said strip to said fibrous backing member and said last mentioned prongs being adapted to pass through and clinch over said fabric material to anchor the same in position.

3. A construction as defined in claim 2 wherein said prongs are arranged generally in alternate groups longitudinally of said strip and struck outwardly in opposite directions from said strip.

GEORGE E. GAGNIER.

REFERENCES CITED

The following references are of record in the file of this patent:

UNITED STATES PATENTS

| Number | Name | Date |
|---|---|---|
| 272,685 | Hart | Feb. 20, 1883 |
| 800,243 | Popple | Sept. 26, 1905 |
| 826,125 | Steinmetz | July 17, 1906 |
| 1,703,522 | Escobales | Feb. 26, 1929 |
| 1,739,943 | Bolender | Dec. 17, 1929 |
| 1,903,469 | Meader | Apr. 11, 1933 |
| 2,003,396 | Smith | June 4, 1935 |
| 2,099,273 | Meyer | Nov. 16, 1937 |
| 2,217,389 | Steger | Oct. 8, 1940 |

FOREIGN PATENTS

| Number | Country | Date |
|---|---|---|
| 4,016 | Sweden | Dec. 10, 1892 |
| 495,606 | Great Britain | Nov. 16, 1938 |